(12) United States Patent
Muller et al.

(10) Patent No.: US 8,674,851 B2
(45) Date of Patent: Mar. 18, 2014

(54) METHOD AND DEVICE FOR DISPLAYING TRIM INFORMATION ON AN AIRPLANE DURING A TAKE-OFF

(71) Applicant: Airbus Operations (S.A.S.), Toulouse (FR)

(72) Inventors: Jean Muller, Tournefeuille (FR); Stéphane Delannoy, Sainte Marie (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 13/746,978

(22) Filed: Jan. 22, 2013

(65) Prior Publication Data
US 2013/0197726 A1 Aug. 1, 2013

(30) Foreign Application Priority Data
Jan. 23, 2012 (FR) .................................... 12 50624

(51) Int. Cl.
*G08G 5/00* (2006.01)
*G08B 23/00* (2006.01)
*G05D 1/08* (2006.01)

(52) U.S. Cl.
USPC .................................. 340/967; 701/15; 701/4

(58) Field of Classification Search
USPC .......... 701/3, 4, 5, 14, 15; 340/959, 964, 967, 340/971, 974, 975; 244/17.13, 75.1, 181, 244/182, 220, 244
See application file for complete search history.

(56) References Cited

U.S. PATENT DOCUMENTS

| | | | | |
|---|---|---|---|---|
| 579,901 A | * | 3/1897 | Smith | 24/466 |
| 5,036,469 A | * | 7/1991 | Pelton | 701/16 |
| 5,127,608 A | * | 7/1992 | Farineau et al. | 244/76 R |
| 5,850,615 A | * | 12/1998 | Osder | 701/4 |
| 6,121,899 A | | 9/2000 | Theriault | |
| 6,154,692 A | * | 11/2000 | Cielaszyk et al. | 701/13 |
| 6,332,105 B1 | * | 12/2001 | Calise et al. | 701/3 |
| 6,648,269 B2 | * | 11/2003 | Gold et al. | 244/17.13 |
| 7,397,391 B2 | | 7/2008 | Foucart et al. | |
| 7,853,369 B2 | | 12/2010 | Villaume | |
| 8,024,079 B2 | * | 9/2011 | Najmabadi et al. | 701/3 |
| 2005/0090947 A1 | * | 4/2005 | Wise | 701/6 |
| 2005/0165516 A1 | * | 7/2005 | Haissig et al. | 701/4 |
| 2007/0156297 A1 | * | 7/2007 | Tzidon | 701/14 |
| 2008/0077284 A1 | * | 3/2008 | Swope | 701/5 |
| 2008/0135688 A1 | * | 6/2008 | Villaume et al. | 244/181 |
| 2009/0062973 A1 | * | 3/2009 | Caldeira et al. | 701/6 |
| 2010/0042270 A1 | * | 2/2010 | Villaume | 701/4 |

(Continued)

FOREIGN PATENT DOCUMENTS

FR 2883650 9/2006
FR 2909462 6/2008

OTHER PUBLICATIONS

French Search Report for FR 12 50624 dated Nov. 9, 2012.

*Primary Examiner* — John R Olszewski
*Assistant Examiner* — Nicholas K Wiltey
(74) *Attorney, Agent, or Firm* — Jenkins, Wilson, Taylor & Hunt, P.A.

(57) ABSTRACT

A method and device for displaying trim information on an airplane during a take-off, for determining and displaying a precise trim setpoint which enables the pilot, by following the displayed information, to carry out a manual take-off which is optimized from the performance point of view.

10 Claims, 1 Drawing Sheet

(56) References Cited

U.S. PATENT DOCUMENTS

| | | | |
|---|---|---|---|
| 2010/0078518 A1* | 4/2010 | Tran et al. | 244/87 |
| 2010/0241293 A1* | 9/2010 | Ganguli et al. | 701/4 |
| 2010/0318336 A1* | 12/2010 | Falangas | 703/8 |
| 2010/0324758 A1* | 12/2010 | Piasecki et al. | 701/3 |
| 2010/0332052 A1* | 12/2010 | Ratliff | 701/3 |
| 2011/0029159 A1* | 2/2011 | Puig | 701/3 |
| 2011/0040430 A1* | 2/2011 | Tessier | 701/3 |
| 2012/0138729 A1* | 6/2012 | Hindman et al. | 244/3.21 |

* cited by examiner

METHOD AND DEVICE FOR DISPLAYING TRIM INFORMATION ON AN AIRPLANE DURING A TAKE-OFF

TECHNICAL FIELD

The present invention relates to a method and a device for displaying trim information on an airplane, at least during a take-off phase.

BACKGROUND

When an airplane is taking off, there is no operational flight director on the vertical axis, that can be used to assist a pilot during said take-off. The expression "take-off of the airplane" should be understood here to mean the travel to the take-off, the rotation phase and until power cut-back plus a few seconds (typically 5 seconds). In particular, during the rotation phase, the pilot has to perform the rotation without the assistance of a flight director, to achieve a certain trim (typically 15°) with a certain pitch rate (typically 3°/s).

SUMMARY

The present invention relates to a method for displaying trim information on an airplane at least during a take-off phase, which makes it possible to remedy the abovementioned drawbacks.

To this end, according to the invention, said method according to which a pitch rate order is generated which is transmitted to at least one display screen and there is displayed, in real time, on said display screen, a first symbol indicating the current pitch value of the airplane and a second symbol indicating a pitch setpoint value of the airplane, in accordance with the pitch rate order received, is noteworthy in that, during the take-off phase of the airplane:

a) surveillance is implemented to detect at least one rotation phase of the airplane; and
b) during this rotation phase, a pitch rate order ODV1 is computed using the following expression, and is transmitted to the display screen:

$$ODV1 = \min[K1*(Qobj-Qcom), K2*(\theta obj-\theta c) + K3*Qc]$$

in which:
min corresponds to the minimum value;
Qobj represents a predetermined pitch rate (called objective), which is optimized as specified hereinbelow;
Qcom represents a pitch rate controlled by a pilot via a control column of the airplane;
θobj represents a predetermined trim;
θc represents a current trim of the airplane;
Qc represents a current pitch rate of the airplane; and
K1, K2 and K3 represent predetermined gains.

Thus, by virtue of the invention, a precise trim setpoint is determined and displayed, which enables the pilot, by following the information displayed, to perform a take-off that is optimized from the performance point of view, in the case where the airplane is equipped for the take-off phase with a high-level manual law working by objective, of type Q*, which makes it possible to ensure in all cases that the current pitch rate of the airplane (Qc) will be equal to the pitch rate (Qcom) controlled via the column.

More specifically, according to the invention, the pilot is enabled to control a rotation in accordance with said objective pitch rate Qobj which corresponds to the certification rate. In practice, knowing that the rotation law used on the airplane will ensure that the actual pitch rate Qc of the airplane will indeed be equal to the control Qcom defined by the position of the control column, the order ODV1 has a first part of the form: $K1*(Qobj-Qcom)$, Qobj being equal to the (predetermined) value of the pitch rate which has been defined to optimize the take-off distances (typically Qobj is equal to 3°/s) in relation to performance.

Furthermore, knowing that, to optimize the take-off distances, the airplane has to be balanced at the end of rotation with a predefined trim (θobj), optimized in relation to performance (typically θobj is equal to 15°, all engines operating and 12.5° when one engine is down), the abovementioned computed order is limited in high value by a trim holding law of the form: $K2*(\theta obj-\theta c)+K3*Qc$, with θc being the current longitudinal trim of the airplane.

Consequently, by virtue of the invention, the pilot has information displayed which is sufficient for him to follow in order to perform a manual take-off (using appropriate control members), this information being set to guarantee a take-off compatible with the certified performance tables.

Said pitch rate order ODV1 is therefore computed and used during the rotation phase of the take-off, which is defined between the following two successive moments:
the moment when the airplane which is taxiing on the ground on the runway reaches a predetermined rotation speed; and
the moment when the airplane reaches a predetermined height in relation to the ground, generally 35 feet.

Moreover, advantageously, in step b):
before said rotation phase (during the travel to take-off on the runway used), a pitch rate order ODV2 is computed (that is then transmitted to the display screen for display) using the following expression:

$$ODV2=-(K4*\theta c)+(K5*Qc)$$

in which K4 and K5 represent predetermined gains; and/or
after the rotation phase, a pitch rate order ODV3 is computed (that is transmitted to the display screen for display) which corresponds to an order of a nominal SRS-type law (SRS standing for Speed Reference System, indicative of the optimum trim of the climbing speed).

In a preferred embodiment, said gains K1 to K5 are determined in a preliminary step, and this is done empirically using simulations performed on standard simulators, to obtain optimized values.

The present invention also relates to a piloting assistance device producing a display of trim information on an airplane at least during a take-off phase, said airplane being equipped for the take-off phase with means making it possible to ensure that, in all cases, the current pitch rate of the airplane is equal to the pitch rate controlled by a pilot via a control column of the airplane.

According to the invention, said device of the type comprising a display screen which displays, in real time, a first symbol indicating the current pitch value of the airplane and a second symbol indicating a pitch setpoint value of the airplane, in accordance with a pitch rate order, as well as processing means for generating a pitch rate order which is transmitted to said display screen, is noteworthy in that it also comprises means for implementing surveillance in order to detect a rotation phase of the airplane, and in that said processing means comprise first means for computing a pitch rate order ODV1 which is transmitted to the display screen during the rotation phase (for display), using the following expression:

$$ODV1 = \min[K1*(Qobj-Qcom), K2*(\theta obj-\theta c)+K3*Qc]$$

Furthermore, in a preferred embodiment, said processing means also comprise:
second means for computing a pitch rate order ODV2 which is transmitted to the display screen during a travel to take-off before said rotation phase, using the following expression:

$$ODV2 = -(K4*\theta c)+(K5*Qc)$$

in which K4 and K5 represent predetermined gains; and/or
third means for computing a nominal pitch rate order ODV3 corresponding to an order of a nominal SRS-type law, which is transmitted to the display screen after said rotation phase.

Furthermore, in a preferred embodiment, said device also comprises means for supplying the processing means with the data that is needed to perform the computation of the different pitch rate orders.

Moreover, the present invention also relates to an airplane, in particular a civil transport airplane, which comprises:
a piloting assistance device, such as that mentioned above; and
standard means making it possible to ensure that the current pitch rate of the airplane is always equal to the pitch rate controlled by a pilot via a control column.

BRIEF DESCRIPTION OF THE DRAWING

The figures of the appended drawing will give a clear understanding of how the invention can be implemented. In these figures, identical references designate similar elements.

DETAILED DESCRIPTION

Figure 1:
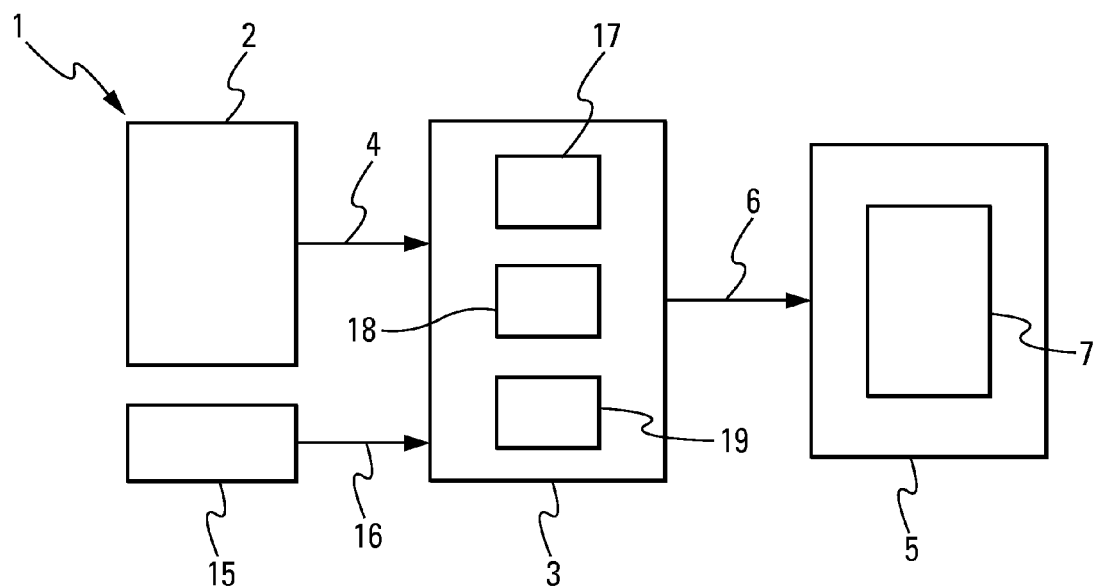
FIG. 1 is the block diagram of a display device according to the invention.
Figure 2:
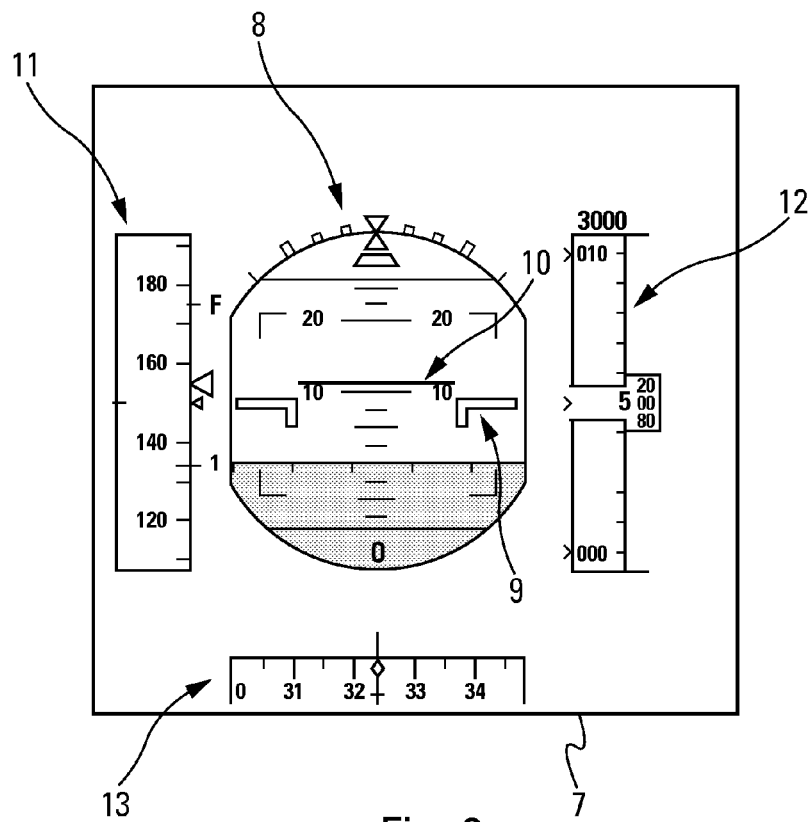
FIG. 2 schematically illustrates a display screen of a device according to the invention.

The device 1 according to the invention and schematically represented in FIG. 1 is intended to display trim information in the cockpit of an airplane (not represented), in particular of a transport airplane, to assist a pilot of the airplane in manually piloting said airplane during a take-off, and in particular during a rotation phase of a take-off.
To do this, said device 1 is of the type comprising:
a set 2 of information sources, which comprises means for determining the actual values of a plurality of parameters of the airplane;
a computation unit 3 which is linked via a link 4 to said set 2 of information sources; and
a display unit 5 which is linked to said computation unit 3 via a link 6 and which is capable of presenting, on a display screen 7, in particular trim information.
FIG. 2 shows a preferred example of a display screen 7 which comprises a display window 8 relating to a flight director which displays, in real time, a first symbol 9 indicating the current pitch value of the airplane (received from standard means) and a second symbol 10 indicating a pitch setpoint value of the airplane, in accordance with a pitch rate order received from the computation unit 3. This standard display makes it possible to guide the pilot in manual piloting.
Furthermore, said display screen 7 also comprises a plurality of standard display windows 11, 12, and 13 which respectively display:

speed information;
altitude information; and
heading information.

Furthermore, as is usual, the airplane comprises in particular for manual piloting during the take-off, notably the following means (not represented):
a pitch control column, which can be actuated by the pilot of the airplane so as to emit a pitch objective. This pitch objective is obtained in the usual way by a linear conversion of the deflection angle generated by the actuation of the column by the pilot;
means for computing, at least from said pitch objective, a deflection order for standard pitch motivators of the airplane; and
means for actuating said pitch motivators, these actuation means being formed in such a way as to bring said pitch motivators to a position representative of said deflection order.

Moreover, the present invention is applied to an airplane which is equipped for the take-off phase with standard means (not represented) comprising a standard high-level manual law working by objective, of type Q*, as described by way of illustration in the documents FR-2 909 462 and U.S. Pat. No. 7,853,369. These standard means make it possible to ensure that, in all cases, the current pitch rate of the airplane (Qc) will be equal to the pitch rate (Qcom) controlled by the pilot via the pitch control column (typically 3°/s for ⅔ of column to be pulled up).

According to the invention, said device 1 also comprises means 15 for implementing monitoring in order to detect a rotation phase of the airplane, which is defined between the following two successive moments:
the moment when the airplane (which is taxiing on the ground on a runway for take-off) reaches a predetermined rotation speed; and
the moment when the airplane (after having left the ground) reaches a predetermined height in relation to the ground, generally 35 feet.

To do this, these means 15 use the current speed of the airplane on the ground, which is measured using standard means (inertial unit) for example forming part of the assembly 2, that they compare to a predetermined rotation speed value dependent on the characteristics of the airplane, to be able to detect the start of the rotation phase as soon as the current speed reaches this rotation speed. Furthermore, when the airplane has left the ground, said means 15 also use a current height value in relation to the ground, which is measured by a radio altimeter (for example forming part of the assembly 2), that they compare to a predetermined height value, to be able to detect the end of the rotation phase as soon as the current height reaches said predetermined value (generally 35 feet). Means 15 can supply data regarding the rotation phase of the aircraft to computation unit 3 via a data link 16.

Furthermore, according to the invention, said processing means 3 comprise means 17 for computing a pitch rate order ODV1 which is transmitted to the display unit 5 during the rotation phase for display on the screen 7. According to the invention, said means 17 compute said pitch rate order ODV1 using the following expressions:

$$ODV1A = K1*(Qobj-Qcom),$$

$$ODV1B = K2*(\theta obj-\theta c)+K3*Qc$$

$$ODV1 = \min[ODV1A, ODV1B]$$

in which:
   min corresponds to the minimum value of the two expressions (ODV1A and ODV1B) indicated between brackets;
   Qobj represents a predetermined objective pitch rate;
   Qcom represents a pitch rate (or speed of variation of the pitch angle) controlled by a pilot via a control column of the airplane;
   θobj represents a predetermined trim;
   θc represents a current trim, which is measured using standard means (sensors) forming part of the assembly 2;
   Qc represents a current pitch rate of the airplane, which is measured using standard means (inertial unit) forming part of the assembly 2; and
   K1, K2 and K3 represent predetermined gains, specified hereinbelow.

Thus, the device 1 according to the invention determines and displays a precise trim setpoint which enables the pilot, by following the information displayed, to perform a take-off that is optimized from the performance point of view.

More specifically, according to the invention, the information presented by the device 1 enables the pilot to control a rotation in accordance with said objective pitch rate Qobj which corresponds to a certification rate. Qobj is in fact the value of the pitch rate which is defined to optimize the take-off distances in relation to performance. Generally, Qobj is equal to 3°/s.

Thus, knowing that the rotation law used on the airplane will ensure that the actual pitch rate of the airplane will indeed be equal to the control Qcom defined by the position of the control column, the order ODV1 has a first part ODV1A of the form: K1*(Qobj−Qcom).

Furthermore, knowing that, to optimize the take-off distances, the airplane must be balanced at the end of rotation with a predefined trim (θobj), optimized in relation to performance (typically θobj is equal to 15° with all engines operating and 12.5° when one engine is down), the order ODV1A is limited in high value by a trim holding law of the form: K2*(Qobj−θc)+K3*Qc, with θc being the current longitudinal trim of the airplane.

Consequently, by virtue of the invention, the pilot has information displayed which is all he needs to follow in order to perform a manual take-off which is compatible with the certified performance tables.

Said pitch rate order ODV1 is therefore computed by the means 17 and used by the unit 5 during the rotation phase of the take-off.

Furthermore, in a preferred embodiment, said processing means 3 also comprise means 18 for computing a pitch rate order ODV2 which is transmitted to the unit 5 during the travel to take-off on the runway for display on the screen 7, before said rotation phase, that is to say as long as the means 15 observe that the current speed of the airplane is less than the rotation speed. Said means 18 compute this pitch rate order ODV2 using the following expression:

$$ODV2=-(K4*\theta c)+(K5*Qc)$$

in which, in addition to the abovementioned parameters, K4 and K5 represent predetermined gains.

Said means 18 thus use a standard trim law with a zero trim as objective, which makes it possible to keep the airplane on the ground throughout the travel to take-off (before the rotation phase).

In the context of the present invention, said gains K1 to K5 are determined in a preliminary step, and this is done empirically using simulations performed on standard simulators, to obtain optimized values.

Moreover, when the means 15 detect that the radio-altimetric altitude becomes greater than 35 feet (that is to say when they detect the end of the rotation phase), the unit 3 sends to the unit 5 a standard order of the initial climb phase of the nominal SRS law.

To do this, the unit 3 comprises standard means 19 which compute a nominal pitch rate order ODV3 which therefore corresponds to an order of a nominal SRS-type law (SRS standing for Speed Reference System, an indicator of the optimum trim of the climbing speed). This pitch rate order ODV3 is therefore transmitted to the display unit 5 after the rotation phase, for display on the screen 7.

The invention claimed is:

1. A method for displaying trim information on an airplane at least during take-off, the method comprising:
   at a device including one or more processors configured to execute one or more of the following steps:
   a) detecting whether the airplane is in a rotation phase of take-off using at least one of a current speed of the airplane, a current altitude of the airplane, a predetermined rotation speed, and a predetermined height; and
   b) computing, during the rotation phase of take-off, a first pitch rate order ODV1 according to the following expression:

$$ODV1=\min[K1*(Qobj-Qcom),K2*(\theta obj-\theta c)+K3*Qc]$$

in which:
      min corresponds to the minimum value;
      Qobj represents a predetermined pitch rate;
      Qcom represents a pitch rate controlled by a pilot via a control column of the airplane;
      θobj represents a predetermined trim;
      θc represents a current trim;
      Qc represents a current pitch rate; and
      K1, K2 and K3 represent predetermined gains, and
   c) displaying, in real time on a display screen, a first symbol indicating a current pitch value of the airplane and a second symbol indicating an airplane pitch setpoint value, in accordance with the first pitch rate order ODV1 transmitted and received at the display screen.

2. The method according to claim 1, wherein the rotation phase is defined between the following two moments:
   a first moment when the airplane which is taxiing on the ground reaches the predetermined rotation speed; and
   a second moment when the airplane reaches the predetermined height in relation to the ground.

3. The method according to claim 1, further comprising computing a second pitch rate order ODV2 before the airplane is in the rotation phase of take-off according to the following expression:

$$ODV2=-(K4*\theta c)+(K5*Qc)$$

in which K4 and K5 represent predetermined gains; and
   transmitting the second pitch rate order ODV2 to the display screen.

4. The method according to claim 1 further comprising computing a nominal pitch rate order ODV3 after the airplane is in the rotation phase of take-off which corresponds to an order of a nominal SRS-type law; and
   transmitting the nominal pitch rate order ODV3 to the display screen.

5. The method according to claim 1, further comprising determining the predetermined gains in a preliminary step, empirically using simulations.

6. A device for displaying trim information on an airplane at least during take-off, the device comprising:

a processor configured to generate a pitch rate order;
a monitoring and surveillance unit configured to detect at least one phase of take-off; and
a display screen configured to display, in real time, a first symbol indicating the current pitch value of the airplane and a second symbol indicating an airplane pitch setpoint value, in accordance with the generated pitch rate order;
wherein the processor is configured to compute a first pitch rate order ODV1 during a rotation phase of take-off, which is transmitted to the display screen during the rotation phase of take-off, and wherein the first pitch rate order ODV1 is computed according to the following expression:

$$ODV1 = \min[K1*(Qobj-Qcom), K2*(\theta obj-\theta c)+K3*Qc]$$

in which:
min corresponds to the minimum value;
Qobj represents a predetermined pitch rate;
Qcom represents a pitch rate controlled by a pilot via a control column of the airplane;
θobj represents a predetermined trim;
θc represents a current trim;
Qc represents a current pitch rate; and
K1, K2 and K3 represent predetermined gains.

7. The device according to claim 6, wherein the processor is configured to compute a second pitch rate order ODV2 before the airplane is in the rotation phase of take-off according to the following expression:

$$ODV2 = -(K4*\theta c)+(K5*Qc)$$

in which K4 and K5 represent predetermined gains.

8. The device according to claim 6, wherein wherein the processor is configured to compute a nominal pitch rate order ODV3 which corresponds to an order of a nominal SRS-type law after the airplane is in the rotation phase of take-off phase.

9. The device according to claim 6, further comprising a data link configured to supply data from one or more sources of information to the processor.

10. An airplane, comprising a device for displaying trim information according to claim 6.

* * * * *